United States Patent
Alderson (10) Patent No.: US 7,577,419 B2
(45) Date of Patent: Aug. 18, 2009

(54) DIGITAL MIXER SYSTEM AND METHOD

(75) Inventor: Jeffrey Donald Alderson, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 450 days.

(21) Appl. No.: 11/641,994

(22) Filed: Dec. 19, 2006

(65) Prior Publication Data

US 2008/0144740 A1    Jun. 19, 2008

(51) Int. Cl.
H04B 1/10    (2006.01)
(52) U.S. Cl. .................... 455/324; 375/324
(58) Field of Classification Search ........... 455/296, 455/302, 303, 304, 323, 324, 340, 341; 375/316, 375/319, 324, 344
See application file for complete search history.

(56) References Cited

U.S. PATENT DOCUMENTS

| | | | |
|---|---|---|---|
| 5,185,609 A | 2/1993 | DeBord | |
| 5,230,011 A * | 7/1993 | Gielis et al. | 455/324 |
| 5,915,028 A | 6/1999 | Chahabadi | |
| 6,175,269 B1 | 1/2001 | Gielis et al. | |
| 6,184,942 B1 | 2/2001 | Patel et al. | |
| 6,208,671 B1 | 3/2001 | Paulos et al. | |
| 6,211,924 B1 | 4/2001 | Patel et al. | |
| 6,333,767 B1 | 12/2001 | Patel et al. | |
| 6,480,233 B1 | 11/2002 | Limberg | |
| 6,512,555 B1 | 1/2003 | Patel et al. | |
| 6,523,147 B1 | 2/2003 | Kroeger et al. | |
| 6,526,101 B1 | 2/2003 | Patel | |
| 6,694,026 B1 | 2/2004 | Green | |
| RE38,456 E | 3/2004 | Patel et al. | |
| 6,700,936 B1 | 3/2004 | Moss | |
| 6,738,610 B1 | 5/2004 | Wildhagen | |
| 7,071,773 B2 | 7/2006 | Kuhn et al. | |
| 2001/0040930 A1 | 11/2001 | Abbey | |
| 2006/0017498 A1 | 1/2006 | Kuhn et al. | |
| 2006/0077300 A1 | 4/2006 | Cheon et al. | |
| 2008/0144743 A1 * | 6/2008 | Alderson et al. | 375/324 |

* cited by examiner

Primary Examiner—Thanh C Le
(74) Attorney, Agent, or Firm—Toler Law Group (57) ABSTRACT

A digital mixer system and method is disclosed. In an embodiment, a digital mixer can receive a modulated signal having a sample rate approximately equal to a clock rate divided by an integer factor. The digital mixer can include a first mixing stage having a first plurality of Coordinate Rotation Digital Computer (CORDIC) elements to serially perform a predetermined number of consecutive CORDIC iterations per clock cycle. The first mixing stage can further have logic to selectively process data received from an output of the first mixing stage. The digital mixer can also include a second mixing stage having a second plurality of CORDIC elements to serially perform a number of consecutive CORDIC iterations per clock cycle. The second mixing stage can also have logic to selectively process data received from an output of the first mixing stage and from an output of the second mixing stage.

22 Claims, 5 Drawing Sheets

DIGITAL MIXER SYSTEM AND METHOD

FIELD OF THE DISCLOSURE

The present disclosure is generally related to systems and methods of mixing digital signals, and more particularly to digital mixers.

BACKGROUND

Digital mixers typically modify a digital signal by introducing a periodic component into the digital signal. One method of introducing a periodic component includes providing an oscillator that generates a periodic signal. However, introducing an oscillator to a mixer increases mixer size and cost of manufacture. Furthermore, oscillators typically use multiplication functions that are computationally expensive because they increase device size and cost while introducing processing delay. Therefore, there is a need for an improved digital mixer and method.

DETAILED DESCRIPTION OF THE DRAWINGS

In a particular embodiment, a digital mixing method is disclosed. The method includes receiving a first input signal modulated using a first modulation mode at an input of a Coordinate Rotation Digital Computer (CORDIC) mixer. The method also includes outputting a first output signal generated by mixing the first input signal substantially to baseband using a first input frequency received at the CORDIC mixer. The method further includes receiving a second input signal modulated using a second modulation mode at the input of the CORDIC mixer and outputting a second output signal generated by mixing the second input signal substantially to baseband using a second input frequency received at the CORDIC mixer.

In another embodiment, a digital mixing method is disclosed. The method includes receiving a first value of a modulated signal at a first input of a mixer and receiving an input frequency at a second input of the mixer. The method also includes performing a first portion of an iterative mixing operation at a first mixing stage using the first value of the modulated signal and the input frequency, where the iterative mixing operation does not include a multiplication function. The method further includes sending a result of the first portion of the iterative mixing operation to a second mixing stage, performing a second portion of the iterative mixing operation at the second mixing stage, and receiving a second value of the modulated signal at the first input of the mixer. The method includes performing the first portion of the iterative mixing operation at the first mixing stage using the second value of the modulated signal and the input frequency, where the first portion of the iterative mixing operation using the second value is performed concurrently with performing the second portion of the iterative operation at the second mixing stage. The method also includes generating an output signal at an output of the mixer, where the output signal is at least partially based on a result of the iterative mixing operation.

In another embodiment, a digital mixer method is disclosed. The method includes determining a total number of Coordinate Rotation Digital Computer (CORDIC) iterations per sample of a modulated signal received at a CORDIC mixer. The CORDIC mixer has multiple pipelined mixing stages, each mixing stage having multiple CORDIC elements to serially process an input within a single clock cycle. The method also includes determining a clock rate, where a sample of the modulated signal is received every N clock cycles, and N is greater than one. The method includes determining a number of CORDIC elements per mixing stage and determining a number of processing loops performed at each mixing stage, where the number of processing loops performed at each mixing stage is greater than one but not greater than N. The method further includes determining a number of pipelined mixing stages, where a product of the number of pipelined mixing stages, the number of processing loops performed at each mixing stage, and the number of CORDIC elements per mixing stage is not less than the total number of CORDIC iterations per sample. The method includes outputting a result that indicates at least one of the number of CORDIC elements per mixing stage, the number of processing loops performed at each mixing stage, and the number of pipelined mixing stages.

In another embodiment, a digital mixer is disclosed that includes a plurality of adders, a shifter, a first input coupled to a first adder of the plurality of adders and further coupled to the shifter. The first input is configured to receive a first signal modulated using a first modulation mode and a second signal modulated using a second modulation mode. The digital mixer includes a second input coupled to a second adder of the plurality of adders and configured to receive an input frequency. The digital mixer also includes a first output to provide a first Inphase (I) signal generated by mixing the first signal substantially to baseband using the shifter and the plurality of adders. The first output further provides a second I signal generated by mixing the second signal substantially to baseband using the shifter and the plurality of adders. The digital mixer also includes a second output to provide a first Quadrature (Q) signal generated by mixing the first signal substantially to baseband using the shifter and the plurality of adders. The second output further provides a second Q signal generated by mixing the second signal substantially to baseband using the shifter and the plurality of adders.

In another embodiment, a digital mixer is disclosed that includes an input to receive a modulated signal having a sample rate approximately equal to a clock rate divided by an integer factor, the integer factor greater than one. The digital mixer also includes input logic to process the modulated signal received at the input. The digital mixer includes a first mixing stage having a first plurality of Coordinate Rotation Digital Computer (CORDIC) elements to serially perform a predetermined number of consecutive CORDIC iterations per clock cycle, where each CORDIC element performs one CORDIC iteration per clock cycle. The first mixing stage further has first logic to selectively process data received from the input logic and from an output of the first mixing stage. The digital mixer also includes a second mixing stage having a second plurality of CORDIC elements to serially perform a same number of consecutive CORDIC iterations per clock cycle as the first mixing stage. The second mixing stage further has second logic to selectively process data received from an output of the first mixing stage and from an output of the second mixing stage.

Figure 1:
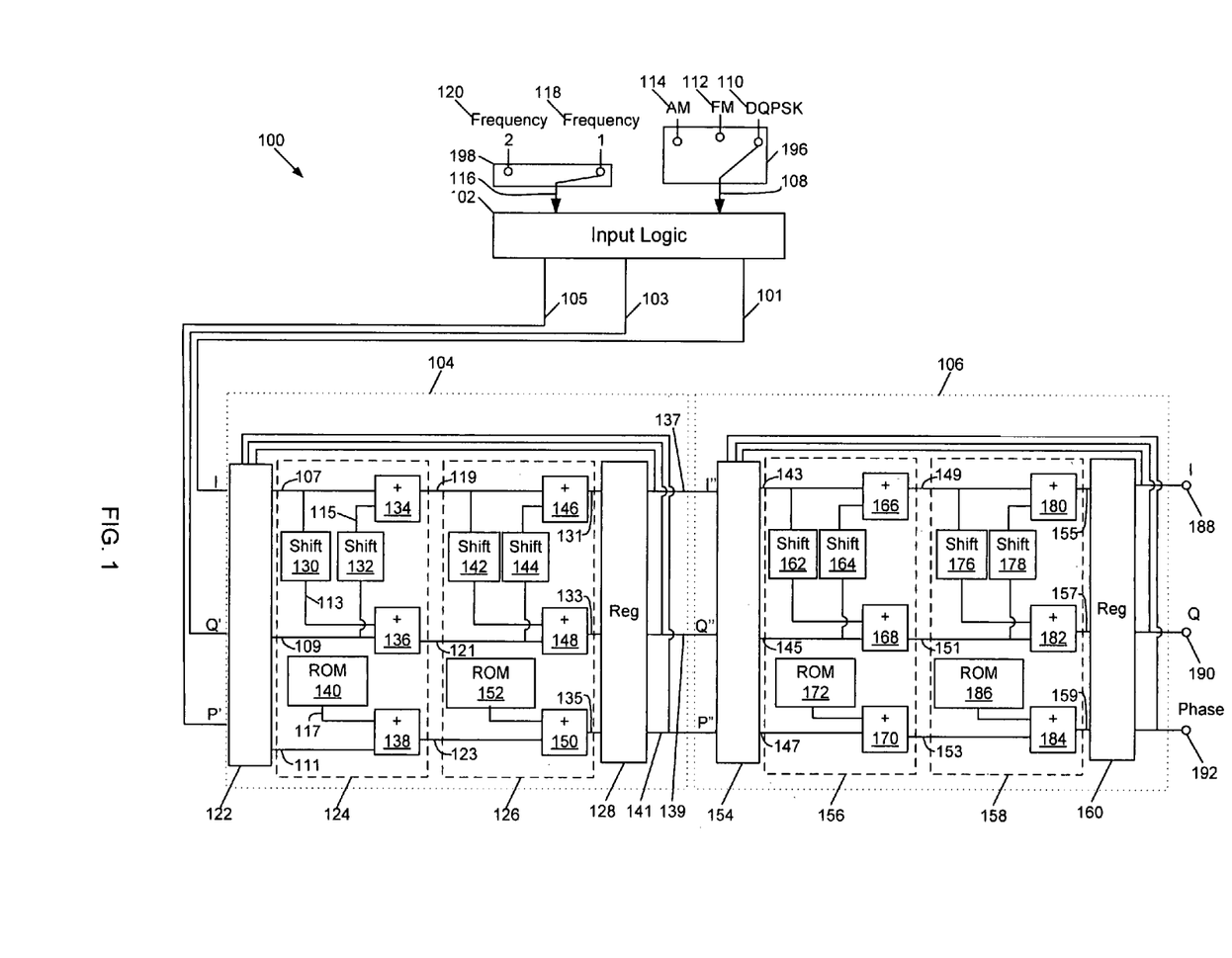
FIG. 1 is a block diagram of a particular illustrative embodiment of a digital mixer.

Referring to FIG. 1, a particular illustrative embodiment of a digital mixer is depicted and generally designated 100. The digital mixer 100 has a first input 108 to receive an input signal and a second input 116 to receive an input frequency. The digital mixer 100 provides an Inphase (I) signal output 188, a Quadrature (Q) signal output 190 and a Phase (P) signal output 192. The I signal 188, the Q signal 190, and the P signal 192 are generated by mixing the input signal received at the first input 108 substantially to baseband using the input frequency received at the second input 116.

In an embodiment, the first input 108 is configured to receive a first signal having a first modulation mode and a second signal having a second modulation mode. Generally, the first modulation mode and the second modulation mode may be any known modulation mode. In a particular embodiment, the first modulation mode is a first one of an amplitude modulation (AM) 114, a frequency modulation (FM) 112, and a differential quadrature phase shift key (DQPSK) modulation 110, and the second modulation mode is a different one of the AM 114, the FM 112, and the DQPSK 110 modulation. In a particular embodiment, a first frequency 118 may be received at the second input 116 to mix the first signal substantially to baseband, and a second frequency 120 may be received at the second input 116 to mix the second signal substantially to baseband.

In a particular embodiment, the first input 108 and the second input 116 are coupled to input logic 102. The input logic 102 processes the input signal received at the first input 108 and the input frequency received at the second input 116. The input logic 102 outputs a first Inphase signal (I') 101, a first Quadrature signal (Q') 103, and a first Phase signal (P') 105 to a first mixing stage 104. The first mixing stage 104 processes the I' signal 101, the Q' signal 103, and the P' signal 105 by performing multiple Coordinate Rotation Digital Computer (CORDIC) iterations to generate a second Inphase signal (I") 137, a second Quadrature signal (Q") 139, and a second Phase (P") 141. A second mixing stage 106 receives the I" signal 137, the Q" signal 139, and the P" signal 141 and generates the I signal 188, the Q signal 190, and the P signal 192 by performing additional CORDIC iterations. The first mixing stage 104 and the second mixing stage 106 together can perform a predetermined number of CORDIC iterations on each sample of the modulated signal received at the first input 108.

In a particular embodiment, the input logic 102 receives a value $V_1$ received at the first input 108 and a phase $P_1$ generated from the input frequency received at the second input 116, and outputs the I' signal 101, the Q' signal 103, and the P' signal 105, with the initial P' signal 105 between −90 degrees and 90 degrees. For each successive CORDIC iteration performed by the mixer 100 using the I' signal 101, the Q' signal 103 and the P' signal 105, an I output of the CORDIC iteration tends to approach the value $V_1\cos(P_1)$ and a Q output of the CORDIC iteration tends to approach $V_1\sin(P_1)$. In addition, a magnitude gain that is roughly proportional to the number of CORDIC iterations is introduced; however, this gain can be offset in later processing or simply ignored. As a result, when the input frequency received at the second input 116 approximately equals a carrier frequency of the signal received at the first input 108, the digital mixer 100 outputs the received signal mixed substantially to baseband, without performing any multiplication functions.

In a particular embodiment, the first mixing stage 104 includes multiplexer logic 122 to provide an I signal 107, a Q signal 109, and a P signal 111 to a first processing element 124. The first processing element 124 outputs an I signal 119, a Q signal 121, and a P signal 123. A second processing element 126 receives the I signal 119, the Q signal 121, and the P signal 123 and outputs an I signal 131, a Q signal 133, and a P signal 133 to a pipeline register 128. The pipeline register 128 enables a pipelined configuration of the first mixing stage 104 and the second mixing stage 106.

In a particular embodiment, the multiplexer logic 122 can selectively send either the I' signal 101, the Q' signal 103, and the P' signal 105 from the input logic 102, or the I" signal 137, the Q" signal 139, and the P" signal 141 from the pipeline register 128 to the first mixing element 124. In a particular embodiment, when a new value of the input signal is received at the first input 108, the multiplexer logic 122 can send the I' signal 101, the Q' signal 103, and the P' signal 105 to the first mixing element 125. When a new value of the input signal is not received at the first input 108, the multiplexer logic 122 can loop the I" signal 137, the Q" signal 139, and the P" signal 141 back to the first mixing stage 124 for further processing.

In a particular embodiment, the second mixing stage 106 includes multiplexer logic 154 to provide an I signal 142, a Q signal 145, and a P signal 147 to the first processing element 156 of the second mixing stage 106. The first processing element 156 outputs an I signal 149, a Q signal 151, and a P signal 153 to the second processing element 158. The second processing element 158 outputs an I signal 155, a Q signal 157, and a P signal 159 to a pipeline register 160.

In a particular embodiment, the multiplexer logic 154 selectively sends the first processing element 156 either the I" signal 137, the Q" signal 139, and the P" signal 141 output by the first mixing stage, or the I signal 188, the Q signal 190, and the P signal 192 output by the second mixing stage 106. In a particular embodiment, when a new value of the input signal is received at the input 108, the multiplexer logic 154 can provide the I" signal 137, the Q" signal 139, and the P" signal 141 output by the first mixing stage 104 to the first processing element 156 of the second mixing stage 106. When a new value of the input signal is not received at the input 108, the multiplexer logic 154 can provide the I signal 188, the Q signal 190, and the P signal 192 output by the second mixing stage to the first processing element 156 for further processing.

In a particular embodiment, the first mixing stage 104 can perform a first iteration of the mixing operation at the first mixing element 124 and a second iteration at the second mixing element 126, followed by a third iteration at the first mixing element 124 and a fourth iteration at the second mixing element 126. The second mixing stage 106 can perform a fifth iteration at the first mixing element 156 of the using the output of the first mixing stage 104, a sixth iteration at the second mixing element 158, a seventh iteration at the first mixing element 156, and an eighth iteration at the second mixing element 158. The resulting I signal 155 and Q signal 157 from the eighth iteration can be provided at the first output 188 and the second output 190 of the digital mixer 100, respectively.

In a particular embodiment, each processing element 124, 126, 156, 158 is a Coordinate Rotation Digital Computer (CORDIC) element that performs a single CORDIC iteration. In general, a CORDIC iteration receives data corresponding to I and Q values, generates a new I value by shifting the received Q data and adding or subtracting the received I data, and generates a new Q value by shifting the received I data and adding or subtracting the received Q data. The received I and Q signals can be shifted by a number of bits determined by the CORDIC iteration number. In a particular embodiment, I and Q can be shifted one bit on the first CORDIC iteration for an input signal, two bits on the second CORDIC iteration, and so on. A phase value is generated by adding or subtracting a received phase value to a phase constant that corresponds to the CORDIC iteration number.

In a particular embodiment, each of the processing elements 124, 126, 156, and 158 operates substantially similarly. For example, the first processing element 124 receives the I signal 107, the Q signal 109, and the P signal 111 from the multiplexer logic 122. The I signal 107 is received at the first adder 134 and the first shifter 130. The first shifter 130 shifts the I signal 107 by an amount proportional to the CORDIC iteration number and provides an output signal 113 to the second adder 136. The second adder 136 also receives the Q signal 109, adds or subtracts the shifted I signal 113 and the Q signal 109 depending on the sign of the Q signal 109, and outputs the Q signal 121 of the first processing element 124. The second shifter 132 shifts the received Q signal 109 by an amount proportional to the CORDIC iteration number and outputs a signal 115 to the first adder 134. The first adder 134 adds or subtracts the received I signal 107 and the shifted Q signal 115 depending on the sign of the Q signal 109 and outputs the I signal 119 output of the first processing element 124. The third adder 138 adds or subtracts the P signal 111 and an output 117 of a Read-Only Memory (ROM) 140 and provides the P signal 123 output of the first processing element 124. The ROM 140 output 117 can be a phase constant that corresponds to the CORDIC iteration number.

Although the first input 108 is depicted in the embodiment of FIG. 1 coupled to one of the AM 114, FM 112, and DQPSK 110 signals via a switching element 196 in the embodiment shown in FIG. 1, in other embodiments the first input 108 can instead receive multiple input signals via a single connection to a signal input. Similarly, although the second input 116 is depicted coupled to one of the first frequency 118 and the second frequency 120 via a switching element 198 in the embodiment shown in FIG. 1, in other embodiments the second input 116 instead receive multiple input frequencies via a single connection to a frequency input.

Figure 2:
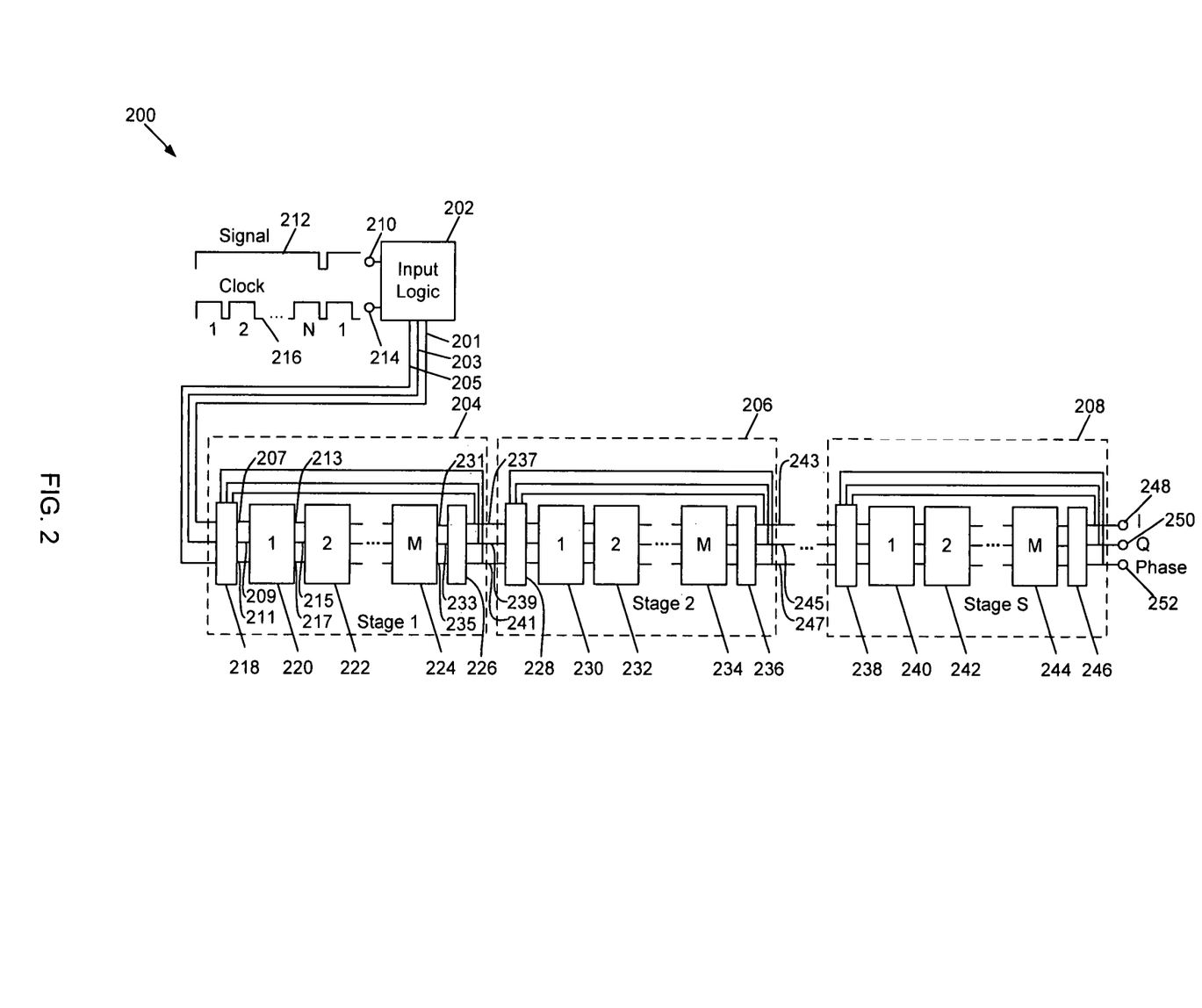
FIG. 2 is a block diagram of a particular illustrative embodiment of a digital mixer.

Referring to FIG. 2, a particular illustrative embodiment of a digital mixer is depicted and generally designated 200. The digital mixer 200 has a first input 210 to receive a modulated signal 212 and a second input 214 to receive a clock signal 216. The modulated signal 212 has a sample rate approximately equal to the clock rate divided by an integer factor that is greater than one. In the particular embodiment depicted in FIG. 2, the integer factor is N.

The digital mixer 200 includes input logic 202 to process the modulated signal 212 received at the first input 210 and output an Inphase (I) signal 201, a Quadrature (Q) signal 203, and a Phase (P) signal 205. A first mixing stage 204 has multiplexer logic 218, a first set of Coordinate Rotation Digital Computer (CORDIC) elements that includes at least a first CORDIC element 220 and a second CORDIC element 222, and a pipeline register 226. In an embodiment, the first mixing stage 204 can include up to a number M of CORDIC elements, depicted as Mth CORDIC element 224. It will be understood that all ellipses depicted in FIG. 2 indicate one or more repeated components in a series of substantially identical components, and further that all of the series of components are coupled via substantially identical connections between neighboring components.

In a particular embodiment, the CORDIC elements 220, 222, and 224 are serially configured so that each element 220, 222, and 224 receives an input, performs a single CORDIC iteration, and outputs a result to the next CORDIC element 220, 222, and 224. The last CORDIC element 224 outputs a result to the pipeline register 226. The term "pipeline register" includes any device, circuit or processing step that may store a value, such as registers, flipflops, other storage devices, or any combination thereof.

In a particular embodiment, the input logic 202 processes a sample of the modulated signal 212 so that the P signal 205 is between −90 degrees and 90 degrees. The input logic 202 outputs the resulting I signal 201, the Q signal 203, and the P signal 205 to the first mixing stage 204. The multiplexer logic 218 provides an I signal 207, a Q signal 209, and a P signal 211 to the first CORDIC element 220. The first CORDIC element 220 performs a CORDIC iteration on the I signal 207, the Q signal 209, and the P signal 211, and outputs an I signal 213, a Q signal 215, and a P signal 217, which are received at a second CORDIC element 222. Likewise, each subsequent CORDIC element receives an I signal, a Q signal, and a P signal from a prior CORDIC element, performs a CORDIC iteration, and outputs a new I signal, Q signal, and P signal to a next CORDIC element. The Mth CORDIC element 224 performs the final CORDIC iteration of the mixing stage 204 and outputs an I signal 231, a Q signal 233, and a P signal 235 to the pipeline register 226. The pipeline register 226 provides an I signal 237, a Q signal 239, and a P signal 241 output of the first mixing stage 240, completing one processing loop. A "processing loop" is used herein to describe a number of consecutive CORDIC iterations that are serially performed in a single clock cycle by a mixing stage, such as the first mixing stage 204, and is determined by the number of CORDIC elements in the mixing stage, such as the CORDIC elements 220, 222, and 224 of the first mixing stage 204.

The multiplexer logic 218 can selectively provide the first CORDIC element 220 with the I signal 201, the Q signal 203, and the P signal 205 from the input logic 202, or with the I signal 237, the Q signal 239, and the P signal 241 output by the first mixing stage 204. In a specific embodiment, a new sample of the signal 212 is received every Nth clock cycle. The first mixing stage 204 has a number M of CORDIC elements, and therefore can perform a processing loop of M iterations during each clock cycle. When a new sample of the signal 212 is received at a first clock cycle, the multiplexer logic 218 can be configured to use the I signal 201, the Q signal 203, and the P signal 205 for the first processing loop. Otherwise, when a new sample of the signal 212 is not received during subsequent clock cycles, the multiplexer logic 218 can be configured to use I signal 237, the Q signal 239, and the P signal 241 for subsequent processing loops until the Nth clock cycle is completed. The first mixing stage 205 can therefore perform a total of M*N CORDIC iterations for each sample of the signal 212.

Similarly, a second mixing stage 206 can have a number M of CORDIC elements 230, 232, and 234 to serially perform M consecutive CORDIC iterations per clock cycle. M can be 2, 3, 4 or more, and is limited by the clock rate. Multiplexer logic 228 can selectively provide the first CORDIC element 230 with the I signal 237, the Q signal 239, and the P signal 241 received from the first mixing stage 204, or with an I signal 243, a Q signal 245, and a P signal 247 from an output of the second mixing stage 206. In a particular embodiment, the multiplexer logic 228 can be configured to perform a predetermined number of CORDIC iterations at the second mixing stage 206 equal to the number of CORDIC iterations performed at the first mixing stage 204.

In a particular embodiment, the digital mixer 200 can include a number S of mixing stages 204, 206, and 208, each substantially similar to the first mixing stage 204 and the second mixing stage 206. Each mixing stage 204, 206, and 208 can have M CORDIC elements and perform N processing loops so that the digital mixer 200 performs a total of N*M*S CORDIC iterations per sample of the input signal 212. The digital mixer 200 can provide an I signal output 248, a Q signal output 250 and a P signal output 252 generated at the Sth number mixing stage 208.

Figure 3:
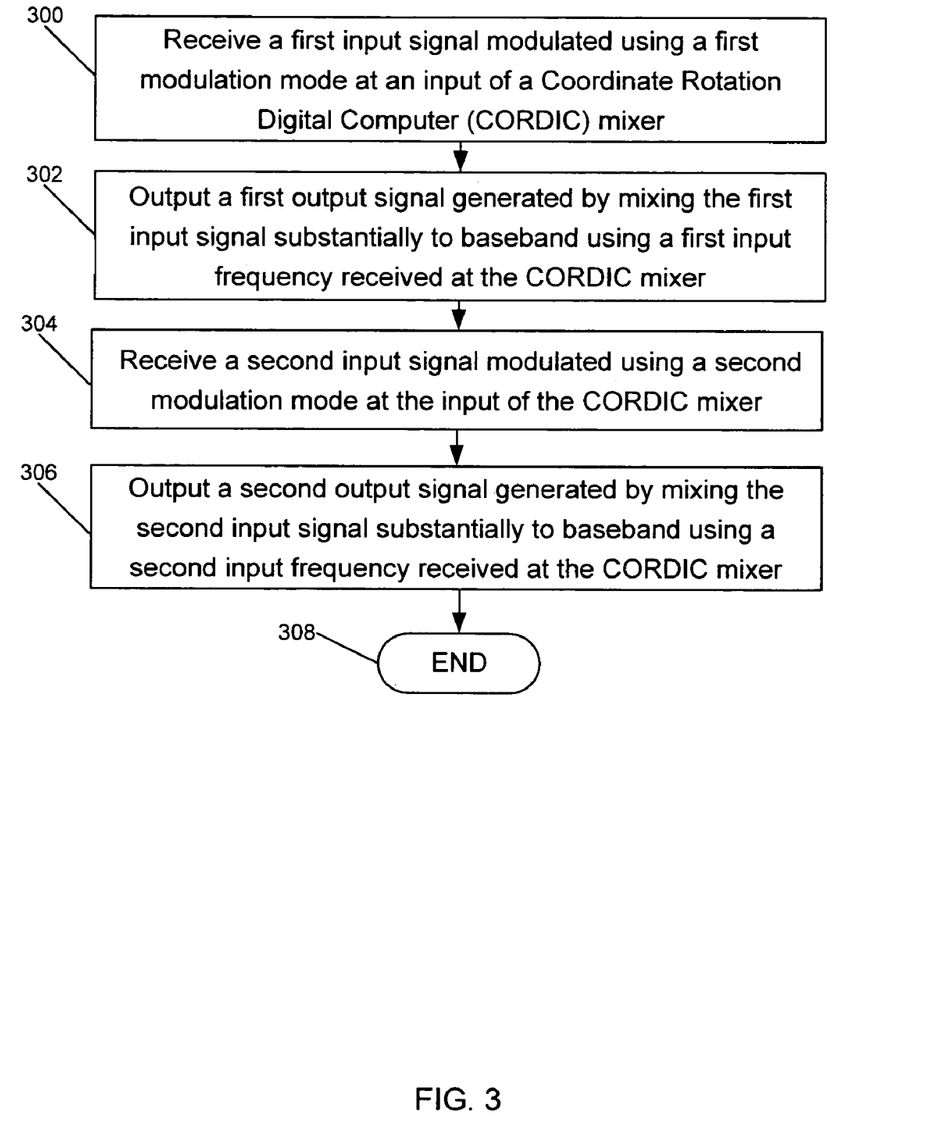
FIG. 3 is a flow chart depicting a particular illustrative embodiment of a digital mixing method.

Referring to FIG. 3, a flow diagram of particular illustrative embodiment of a digital mixing method is depicted. A first input signal that is modulated using a first modulation mode is received at an input of a Coordinate Rotation Digital Computer (CORDIC) mixer, at 300. A first output signal that is generated by mixing the first input signal substantially to baseband using a first input frequency received at the CORDIC mixer is output, at 302. A second input signal that is modulated using a second modulation mode is received at the input of the CORDIC mixer, at 304. A second output signal that is generated by mixing the second input signal substantially to baseband using a second input frequency that is received at the CORDIC mixer is output, at 306.

The first input signal and the second input signal can each be modulated using any modulation mode. In a particular embodiment, the first modulation mode is amplitude modulation (AM), and the second modulation mode is one of frequency modulation (FM) and differential quadrature phase shift keying (DQPSK) modulation. In another particular embodiment, the first modulation mode is frequency modulation (FM) and the second modulation mode is differential quadrature phase shift keying (DQPSK) modulation. In another particular embodiment, the CORDIC mixer includes multiple pipelined mixing stages, such as the mixing sages 104 and 106 of FIG. 1. The method terminates at 308.

Figure 4:
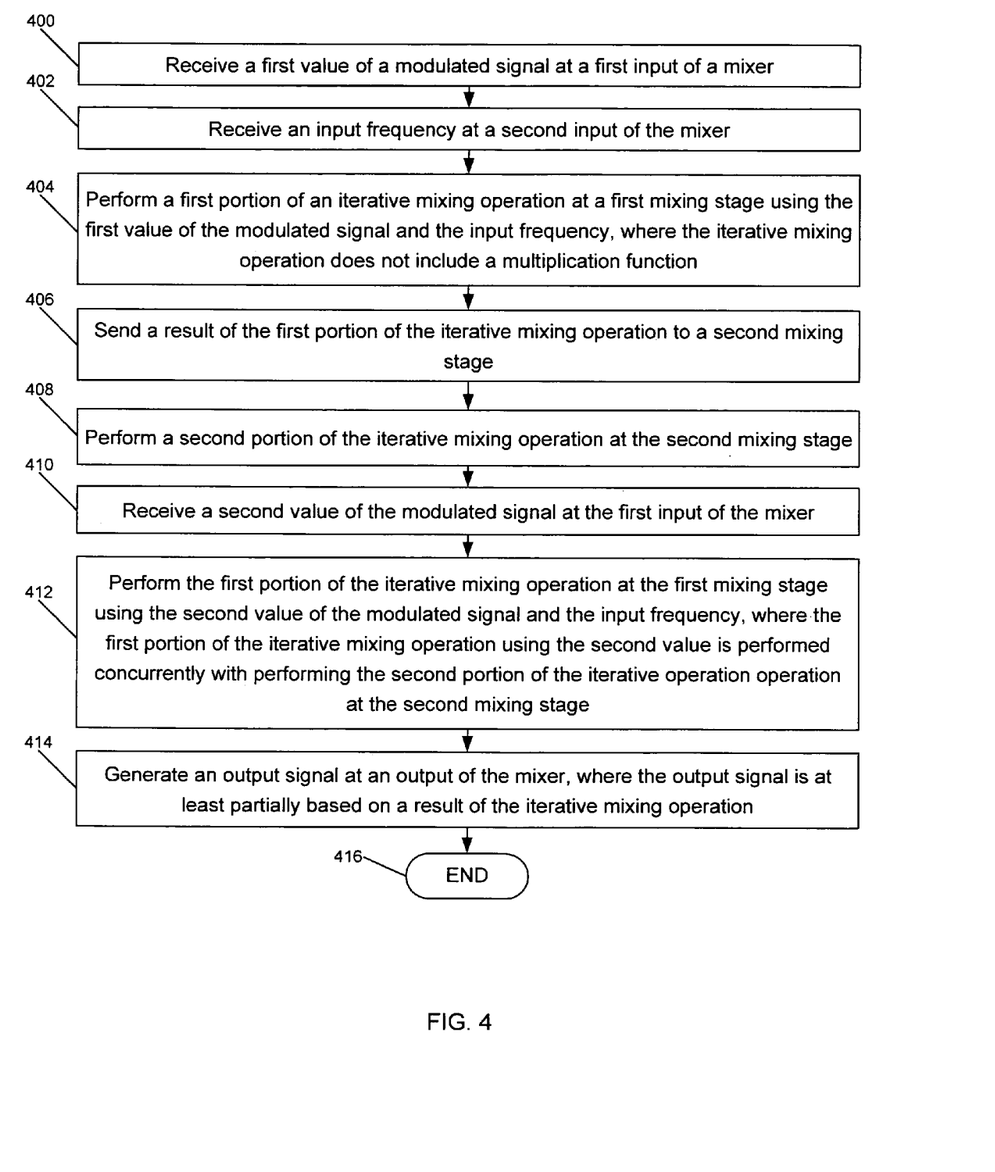
FIG. 4 is a flow chart depicting a particular illustrative embodiment of a digital mixing method.

Referring to FIG. 4, a flow diagram of a particular illustrative embodiment of a digital mixing method is depicted. A first value of a modulated signal is received at a first input of a mixer, at 400. An input frequency is received at a second input of the mixer, at 402. A first portion of an iterative mixing operation is performed at a first mixing stage using the first value of the modulated signal and the input frequency, where the iterative mixing operation does not include a multiplication function, at 404. In a particular embodiment, the iterative mixing operation includes Coordinate Rotation Digital Computer (CORDIC) iterations, such as can be performed by some embodiments of the digital mixer 100 of FIG. 1.

In a particular embodiment, the first portion of the iterative mixing operation includes at least four CORDIC iterations. In an illustrative embodiment, the first portion of the iterative mixing operation is performed by providing an output of the first mixing stage to an input of the first mixing stage to enable multiple processing loops at the first mixing stage. In a particular illustrative embodiment, the first mixing stage can have two CORDIC elements and input logic to perform four CORDIC iterations per input sample, such as the first mixing stage 104 depicted in FIG. 1.

A result of the first portion of the iterative mixing operation is sent to a second mixing stage, at 406. A second portion of the iterative mixing operation is performed at the second mixing stage, at 408. In a particular embodiment, the second portion of the iterative mixing operation comprises at least four CORDIC iterations.

A second value of the modulated signal is received at the first input of the mixer, at 410. In an illustrative embodiment, the first value and the second value can be consecutive samples of a digital signal received at the first input. The first portion of the iterative mixing operation is performed at the first mixing stage using the second value of the modulated signal and the input frequency, where the first portion of the iterative mixing operation using the second value is performed concurrently with performing the second portion of the iterative operation at the second mixing stage, at 412. An output signal is generated at an output of the mixer, where the output signal is at least partially based on a result of the iterative mixing operation, at 414.

In a particular embodiment, the method can further include sending a result of the second portion of the iterative mixing operation to a third mixing stage and performing a third portion of the iterative mixing operation at the third mixing stage. In other embodiments of the method depicted in FIG. 4, any number of pipelined mixing stages can be used, with each mixing stage performing a portion of the iterative operation. The method terminates at 416.

Figure 5:
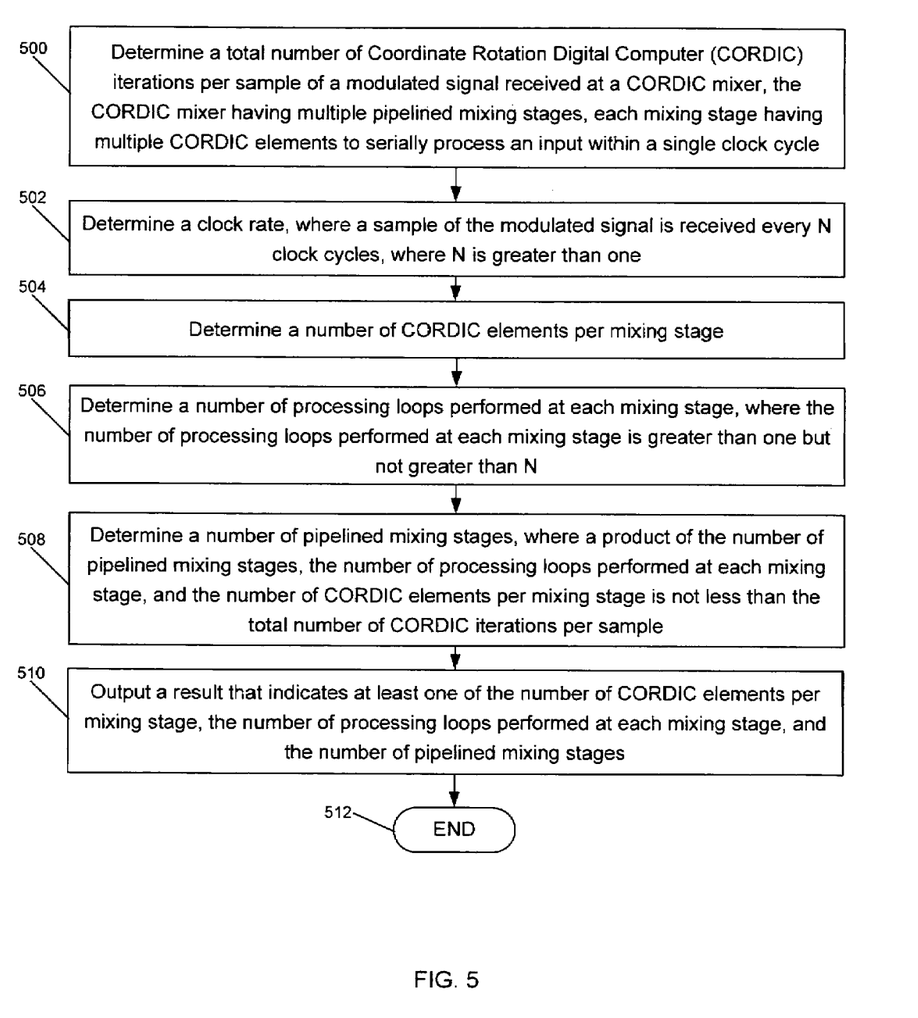
FIG. 5 is a flow chart depicting a particular illustrative embodiment of a digital mixing method.

Referring to FIG. 5, a flow diagram of a particular illustrative embodiment of a digital mixer method is depicted. A total number of Coordinate Rotation Digital Computer (CORDIC) iterations per sample of a modulated signal received at a CORDIC mixer is determined, at 500. The CORDIC mixer has multiple pipelined mixing stages, with each mixing stage having multiple CORDIC elements to serially process an input within a single clock cycle.

A clock rate is determined, where a sample of the modulated signal is received every N clock cycles, and N is greater than one, at 502. A number of CORDIC elements per mixing stage is determined, at 504. In a particular embodiment, the number of CORDIC elements per mixing stage can be determined to be the maximum number of consecutive CORDIC operations that can be completed in a single clock cycle.

A number of processing loops performed at each mixing stage is determined, where the number of processing loops performed at each mixing stage is greater than one but not greater than N, at 506. A number of pipelined mixing stages is determined, where a product of the number of pipelined mixing stages, the number of processing loops performed at each mixing stage, and the number of CORDIC elements per mixing stage is not less than the total number of CORDIC iterations per sample, at 508. A result is output that indicates at least one of the number of CORDIC elements per mixing stage, the number of processing loops performed at each mixing stage, and the number of pipelined mixing stages, at 510. The method terminates at 512.

The method of FIG. 5 enables efficient design of a mixer using repeated components. Generally, a relationship between a number M of CORDIC elements per mixing stage, a number L of processing loops performed at each mixing stage, and a number S of pipelined mixing stages can be represented by $M*L*S>=Tmin$, where Tmin is a minimum number of total CORDIC iterations per sample. Thus, in some embodiments, a designer can vary M, L, and S to improve mixer performance in light of design criteria.

Furthermore, one or more values of M, L and S can be constrained by one or more design constraints. In a particular embodiment where the clock cycle is fixed, M can be constrained to not exceed a maximum number of consecutive CORDIC iterations that can be performed in a single clock cycle. In another particular embodiment where the sample rate is fixed, a product of M and L can be constrained to not exceed a total number of CORDIC operations that can be performed per sample.

In a particular embodiment, at least one of the mixing stages includes a pipeline register, which can increase space and manufacturing cost for a mixer. Therefore, a designer can determine values of M, L and S to reduce a number of mixing stages and thus a number of pipeline registers.

Other design constraints can affect determining the values of the CORDIC mixer. In a particular embodiment, at least one of the number of CORDIC elements per mixing stage, the number of processing loops performed at each mixing stage, and the number of pipelined mixing stages is determined at least partially based on a cost of manufacture. In another particular embodiment, at least one of the number of CORDIC elements per mixing stage, the number of processing loops performed at each mixing stage, and the number of pipelined mixing stages is determined at least partially based on a size of the CORDIC mixer.

While specific systems and components of systems have been shown, it should be understood that many alternatives are available for such systems and components. In a particular illustrative embodiment, for example, a digital mixer may include hardware, software, firmware, or any combination thereof to perform functions and methods of operation as described. It should be understood that particular embodiments may be practiced solely by a processor executing processor instructions and accessing a processor readable memory, or in combination with hardware, firmware, software, or any combination thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A digital mixing method comprising:
   receiving a first input signal modulated using a first modulation mode at an input of a Coordinate Rotation Digital Computer (CORDIC) mixer;
   outputting a first output signal generated by mixing the first input signal substantially to baseband using a first input frequency received at the CORDIC mixer;
   receiving a second input signal modulated using a second modulation mode at the input of the CORDIC mixer; and
   outputting a second output signal generated by mixing the second input signal substantially to baseband using a second input frequency received at the CORDIC mixer.

2. The method of claim 1, wherein the first modulation mode is amplitude modulation (AM), and wherein the second modulation mode is one of frequency modulation (FM) and differential quadrature phase shift keying (DQPSK) modulation.

3. The method of claim 1, wherein the first modulation mode is frequency modulation (FM) and the second modulation mode is differential quadrature phase shift keying (DQPSK) modulation.

4. The method of claim 1, wherein the CORDIC mixer includes multiple pipelined mixing stages.

5. A digital mixing method comprising:
   receiving a first value of a modulated signal at a first input of a mixer;
   receiving an input frequency at a second input of the mixer;
   performing a first portion of an iterative mixing operation at a first mixing stage using the first value of the modulated signal and the input frequency, wherein the iterative mixing operation does not include a multiplication function;
   sending a result of the first portion of the iterative mixing operation to a second mixing stage;
   performing a second portion of the iterative mixing operation at the second mixing stage;
   receiving a second value of the modulated signal at the first input of the mixer;
   performing the first portion of the iterative mixing operation at the first mixing stage using the second value of the modulated signal and the input frequency, wherein the first portion of the iterative mixing operation using the second value is performed concurrently with performing the second portion of the iterative operation at the second mixing stage; and
   generating an output signal at an output of the mixer, wherein the output signal is at least partially based on a result of the iterative mixing operation.

6. The method of claim 5, wherein the iterative mixing operation includes Coordinate Rotation Digital Computer (CORDIC) iterations.

7. The method of claim 6, wherein the first portion of the iterative mixing operation comprises at least four CORDIC iterations.

8. The method of claim 7, wherein the second portion of the iterative mixing operation comprises at least four CORDIC iterations.

9. The method of claim 8, further comprising:
   sending a result of the second portion of the iterative mixing operation to a third mixing stage; and
   performing a third portion of the iterative mixing operation at the third mixing stage.

10. A digital mixing method comprising:
    determining a total number of Coordinate Rotation Digital Computer (CORDIC) iterations per sample of a modulated signal received at a CORDIC mixer, the CORDIC mixer having multiple pipelined mixing stages, each mixing stage having multiple CORDIC elements to serially process an input within a single clock cycle;

determining a clock rate, wherein a sample of the modulated signal is received every N clock cycles, N is greater than one;

determining a number of CORDIC elements per mixing stage;

determining a number of processing loops performed at each mixing stage, wherein the number of processing loops performed at each mixing stage is greater than one but not greater than N;

determining a number of pipelined mixing stages, wherein a product of the number of pipelined mixing stages, the number of processing loops performed at each mixing stage, and the number of CORDIC elements per mixing stage is not less than the total number of CORDIC iterations per sample; and outputting a result that indicates at least one of the number of CORDIC elements per mixing stage, the number of processing loops performed at each mixing stage, and the number of pipelined mixing stages.

11. The method of claim 10, wherein at least one mixing stage includes a pipeline register, and wherein at least one of the number of CORDIC elements per mixing stage, the number of processing loops performed at each mixing stage, and the number of pipelined mixing stages is determined at least partially based on a cost of manufacture.

12. The method of claim 10, wherein at least one mixing stage includes a pipeline register, and wherein at least one of the number of CORDIC elements per mixing stage, the number of processing loops performed at each mixing stage, and the number of pipelined mixing stages is determined at least partially based on a size of the CORDIC mixer.

13. A digital mixer, comprising:
a plurality of adders;
a shifter;
a first input coupled to a first adder of the plurality of adders and further coupled to the shifter, wherein the first input is configured to receive a first signal modulated using a first modulation mode and a second signal modulated using a second modulation mode;
a second input coupled to a second adder of the plurality of adders and configured to receive an input frequency;
a first output to provide a first Inphase (I) signal generated by mixing the first signal substantially to baseband using the shifter and the plurality of adders, the first output further to provide a second I signal generated by mixing the second signal substantially to baseband using the shifter and the plurality of adders; and
a second output to provide a first Quadrature (Q) signal generated by mixing the first signal substantially to baseband using the shifter and the plurality of adders, the second output further to provide a second Q signal generated by mixing the second signal substantially to baseband using the shifter and the plurality of adders.

14. The digital mixer of claim 13, wherein the first modulation mode is a first one of an amplitude modulation (AM), a frequency modulation (FM), and a differential quadrature phase shift key (DQPSK) modulation, and wherein the second modulation mode is a different one of the AM, the FM, and the DQPSK modulation.

15. The digital mixer of claim 14, wherein the mixer is operable to mix each of the first signal and the second signal without performing a multiplication function.

16. The digital mixer of claim 15, wherein the mixer performs a predetermined number of iterative operations using the shifter and the plurality of adders for each signal value received at the first input.

17. The digital mixer of claim 16, further comprising a multiplexer to selectively couple an output of the plurality of adders to the first input.

18. The digital mixer of claim 16, wherein the iterative operations comprise Coordinate Rotation Digital Computer (CORDIC) operations.

19. The digital mixer of claim 18, further comprising multiple pipelined mixing stages, wherein each mixing stage performs at least four of the predetermined number of iterative operations for each signal value received at the first input.

20. A digital mixer, comprising:
an input to receive a modulated signal having a sample rate approximately equal to a clock rate divided by an integer factor, the integer factor greater than one;
input logic to process the modulated signal received at the input;
a first mixing stage having a first plurality of Coordinate Rotation Digital Computer (CORDIC) elements to serially perform a predetermined number of consecutive CORDIC iterations per clock cycle, wherein each CORDIC element performs one CORDIC iteration per clock cycle, the first mixing stage further having first logic to selectively process data received from the input logic and from an output of the first mixing stage; and
a second mixing stage having a second plurality of CORDIC elements to serially perform a same number of consecutive CORDIC iterations per clock cycle as the first mixing stage, the second mixing stage further having second logic to selectively process data received from an output of the first mixing stage and from an output of the second mixing stage.

21. The digital mixer of claim 20, wherein the first logic is configured to perform a first predetermined number of CORDIC iterations at the first mixing stage, the first predetermined number of CORDIC iterations at the first mixing stage equal to the product of the integer factor and the predetermined number of consecutive CORDIC iterations per clock cycle.

22. The digital mixer of claim 21, wherein the second logic is configured to perform a second predetermined number of CORDIC iterations at the second mixing stage, the second predetermined number of CORDIC iterations at the second mixing stage equal to the first predetermined number of CORDIC iterations at the first mixing stage.

* * * * *